United States Patent [19]

Corner et al.

[11] 4,342,469
[45] Aug. 3, 1982

[54] TRAILER SUSPENSION SYSTEMS

[75] Inventors: Frank G. Corner, Mission Viejo; Robert E. Wilkinson, Riverside, both of Calif.

[73] Assignee: Fleetwood Enterprises, Inc., Riverside, Calif.

[21] Appl. No.: 119,001

[22] Filed: Feb. 6, 1980

[51] Int. Cl.³ ............................................... B60G 11/02
[52] U.S. Cl. .................................. 280/718; 280/81 A
[58] Field of Search ............ 280/426, 442, 113, 81 A, 280/688, 686, 718, 699, 685, 724, 725; 267/54 R

[56] References Cited

U.S. PATENT DOCUMENTS

| | | | |
|---|---|---|---|
| 2,141,781 | 12/1938 | Allen | 280/699 |
| 2,253,217 | 8/1941 | Wenthe | 280/699 |
| 2,576,824 | 11/1951 | Bush | 280/724 |
| 2,606,037 | 8/1952 | Hoffman | 280/718 |
| 2,701,713 | 2/1955 | Tea | 267/54 R |
| 3,356,386 | 12/1967 | Taylor | 280/724 |
| 3,540,756 | 11/1970 | Stout | 280/718 |

FOREIGN PATENT DOCUMENTS

| | | | |
|---|---|---|---|
| 497980 | 1/1951 | Belgium | 280/724 |
| 149054 | 8/1920 | United Kingdom | 280/718 |
| 326354 | 3/1930 | United Kingdom | 280/699 |

*Primary Examiner*—Joseph F. Peters, Jr.
*Assistant Examiner*—Ross Weaver
*Attorney, Agent, or Firm*—Edward D. O'Brian; K. H. Boswell

[57] ABSTRACT

The towing characteristics of a trailer can be improved by utilizing a suspension system for the wheels of the trailer which tends to steer the trailer as it is towed behind a vehicle. Such a suspension system preferably includes an axle extending beneath the frame or body of the trailer, wheels on the ends of the axles and mounting structure such as springs connecting the ends of the axle to the body or frame. These mounting structures are constructed so as to cause the axle to move relative to the body of the frame so that the wheels tend to steer the trailer in response to the forces exerted on the mounting structures as the trailer is turned as it is being towed.

6 Claims, 8 Drawing Figures

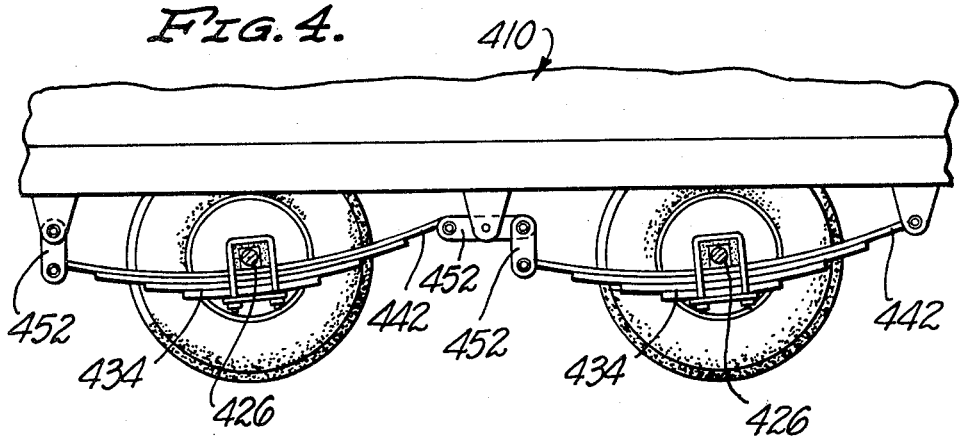
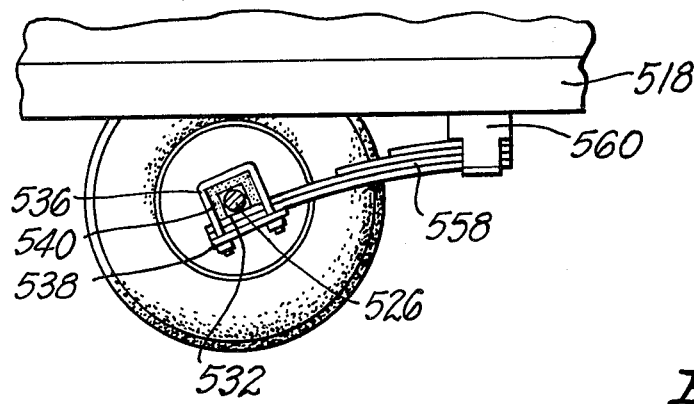
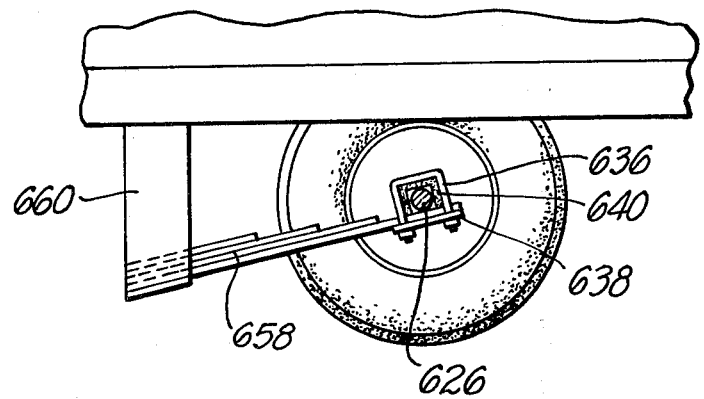

TRAILER SUSPENSION SYSTEMS

BACKGROUND OF THE INVENTION

The invention set forth in this specification pertains to new and improved trailer suspension systems. More specifically, it relates to trailer suspension systems which tend to automatically steer a trailer in response to forces exerted as the trailer is turned in response to the vehicle towing it being turned or in response to crosswinds tending to move the trailer.

The term "trailer" as used in this specification is intended to designate any of a variety of different wheeled structures which are constructed so that they are adapted to be towed along a road or highway behind a vehicle such as a car, a van or the like. Such trailers are normally constructed so as to include a frame or chassis supporting a body constructed in accordance with the intended use of the trailer. On occasion the body of the trailer may be constructed so as to in effect serve as the frame or chassis of the trailer. Because of this, it is considered proper to refer to both the body of the trailer and the frame or chassis of the trailer more or less synonymously. Such a frame or chassis normally includes a so-called tongue extending from the front end of the trailer and supporting a coupler mechanism adapted to be secured to hitch on the towing vehicle in such a manner as to transmit forces corresponding to the movement of the towing vehicle to the trailer. Such trailers are normally constructed so as to utilize a suspension system supporting one or more wheels at each side of the trailer. Such wheels are normally located near the centers of the sides of the trailer. These wheels may be connected by axles extending between the sides of the trailer or they may be mounted upon the frame or chassis through the use of arms or similar members. In either case it is conventional to utilize springs or other resilient members in connection with the mounting of the wheels so as to accommodate vertical movement of the wheels in response to road surface irregularities and the like.

It is commonly recognized that a number of different factors are important in constructing a trailer so as to minimize the affects of the trailer on the operation of the towing vehicle and so as to provide a trailer structure which will "track" or go in a line following the path of the towing vehicle. It is not considered that an understanding of the present invention requires a detailed discussion of all of such factors. In general the greater the weight applied to the towing vehicle through the trailer hitch and tongue as a result of the construction or load of the trailer, the greater the effect of the trailer on the operation of the towing vehicle.

In the past it has been commonplace to attempt to improve the towing characteristics or towing ability of trailers by utilizing various different types of sway control devices and load equalizing devices not forming a part of a suspension system of a trailer. While the use of such auxiliary devices or mechanisms is in many respects satisfactory such use is nevertheless considered undesirable. A prime reason for this relates to economics; such devices cost money.

As a result of this, it is considered that there is a need to improve the construction of trailers so as to substantially eliminate the need for using sway control devices and weight distribution or equalizing devices. It is considered that this need is particularly important in connection with trailers which are intended to be towed behind comparatively small, comparatively lightweight towing vehicles such as, for example, comparatively small cars employing front wheel drive. In general, the lighter the weight of a towing vehicle the greater the affect of trailer tongue weight on the performance of the vehicle.

This letter is considered to be important with respect to the desirability of the present invention. It is considered that it is commonly recognized that reasonably satisfactory towing characteristics are related to a trailer being constructed or loaded so as to apply what may be referred to as a "moderate" weight to the towing vehicle through the trailer hitch and tongue. Such weights as have been used in the past have frequently been sufficiently great so as to significantly effect the performance and operation of comparatively small cars such as are increasingly being utilized.

As a result of this in order to provide trailers which can be satisfactorily towed behind such small vehicles trailers are increasingly being constructed which are comparatively light in weight and which are "balanced" relative to their wheels so that comparatively low tongue weights are applied to the towing vehicle through the trailer hitch. However, in the past it has been considered that the construction or loading of a trailer so as to minimize the tongue weight applied to a towing vehicle is considered somewhat disadvantageous as tending to detrimentally affect the towing characteristics or towability of the trailer.

As a consequence of this it is considered that there is a definite need for new and improved trailers which have satisfactory towing or towability characteristics even though such trailers are constructed so as to apply comparatively low tongue weights to a vehicle. Further, it is considered that there is a need for accomplishing such improvement without significantly increasing the cost or complexity of constructing such trailers.

SUMMARY OF THE INVENTION

Broadly the present invention is intended to provide solutions to the various needs briefly outlined in the preceding discussion. The invention is intended to provide new and improved trailer suspension systems which, when used as parts of trailers, improve the affects of the trailer on the riding and handling characteristics of a towing vehicle. Through the use of suspension systems in accordance with this invention it is intended to achieve improvement in the towability of a trailer, regardless of the relative load that the trailer applies to the towing vehicle and to decrease the affect of the trailer on the operation of a towing vehicle.

Thus, the invention is considered to be broadly applicable to trailers such as have been and are still being constructed so as to apply comparatively heavy loads to a towing vehicle as well as trailers which are constructed so as to apply comparatively light loads to a towing vehicle. An objective of the present invention is also to achieve such improvement in what may be referred to as handling characteristics without significantly increasing the complexity of a trailer suspension system and without significantly increasing the cost of such a suspension system.

In accordance with this invention these various objectives of the invention are achieved by providing a trailer suspension system for use as a part of a complete trailer which is adapted to be towed behind a moving vehicle, said trailer including a body structure having a front, a rear, sides and a bottom, wheels located substantially adjacent to said sides between said front and said rear and extending generally beneath said body, said suspension system including an individual suspension means connecting each of said wheels to said body structure, each of said suspension means being capable of permitting movement of the wheel associated with it in a generally vertical direction in response to surface irregularities in which the improvement comprises: each of said suspension means is capable of moving in response to an applied force so as to vary the angle of the wheel associated with it with respect to said body so as to be capable of steering said trailer as said trailer is towed behind said vehicle so that said trailer follows the direction of movement of said vehicle.

The expression "suspension means" used in the preceding is employed as a broad, generic expression to designate a wide variety of different types of suspension structures. Such suspension structures are closely related to various types of suspension structures as have previously been utilized in mounting trailer wheels, but differ from such prior suspension structures primarily as to mounting details important in obtaining the type of steering action desired with the present invention.

From this it is believed that it will also be apparent that the invention set forth in this specification is not merely related to the physical construction of a trailer so as to utilize a suspension system having the characteristics described, but in addition it is related to a method of operating a trailer as the trailer is towed behind a towing vehicle so that, in effect, the trailer is automatically steered as a result of various loads or forces applied to the suspension system as the trailer is towed. With the present invention the process steps of this method are preferably carried out automatically as a result of the construction of the suspension system as a trailer is towed behind a towing vehicle.

Those objectives of the invention pertaining to a process of steering a trailer are achieved by providing a method of controlling the movement of a wheeled trailer in which the wheels are supported by suspension means so as to be capable of movement relative to the remainder of the trailer in response to the loads applied to the suspension means as the trailer is towed behind a towing vehicle so as to steer said trailer so that it follows the movement of the vehicle, which method comprises: utilizing the weight of the trailer as applied to said suspension means and forces applied to said suspension means as a result of movement of said towing vehicle in other than a straight path and as a result of wind loads applied to said trailer so as to tend to move said trailer so that it does not follow directly behind said towing vehicle so as to cause movement of said suspension means so as to vary the position of said wheels relative to said trailer so that said trailer is steered so as to follow the path of said towing vehicle.

BRIEF DESCRIPTION OF THE DRAWINGS

Because of the nature of the present invention it is considered that it is best more fully explained with reference to the accompanying drawings in which:

FIG. 4 is a partial side elevational view corresponding to part of FIG. 1 of a further modified trailer suspension system based upon the structure illustrated in FIG. 1;

FIG. 5 is a partial side elevational view corresponding to part of FIG. 1 of another modified trailer suspension system of the present invention;

FIG. 6 is a partial side elevational view corresponding to part of FIG. 1 of another, further modified trailer suspension system of the present invention;

Figure 1:
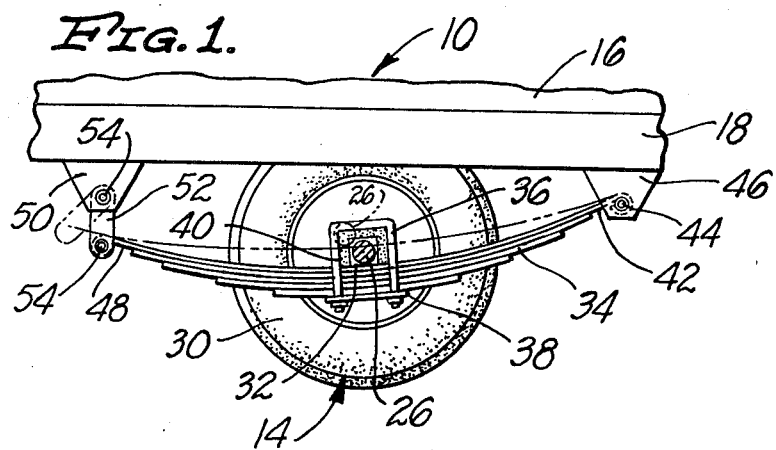
FIG. 1 is a partial side elevational view of a trailer constructed so as to utilize a presently preferred embodiment or form of a trailer suspension system in accordance with this invention, portions of the structure shown in this figure being broken away so as to facilitate a discussion of this structure involved.

The invention set forth in this specification embodies certain essentially intangible concepts which are utilized within various structures illustrated in the drawing and as are set forth and defined in the appended claims forming a part of this specification. From a careful consideration of the drawings and this specification those skilled in the design and construction of vehicle suspension systems and in particular the design and construction of trailer suspension systems will realize that the concepts of the invention verbally expressed in the claims can be easily utilized in a number of different manners and in a number of differently appearing structures through the use or exercise of routine engineering skill.

DETAILED DESCRIPTION

Figure 2:
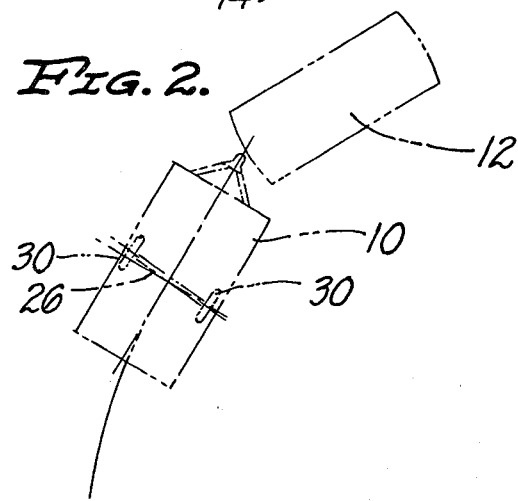
FIG. 2 is a diagrammatic top plan view indicating axle location and direction of axle movement as a trailer as shown in FIG. 1 is towed behind a towing vehicle.

In FIG. 1 of the drawing there is shown a trailer 10 constructed so as to utilize a presently preferred embodiment or form of a suspension system (not separately numbered) in accordance with this invention. This trailer 10 is adapted to be towed behind a towing vehicle 12 as indicated in FIG. 2 of the drawing so that the various wheels 14 used to support the trailer 10 will be positioned in various relative positions as indicated in FIG. 2 of the drawing as the vehicle 12 tows the trailer 10.

The particular trailer 10 may be constructed in many different ways in accordance with conventional practice. The particular trailer 10 illustrated is constructed so as to include a body 16 useful as a so-called "house trailer", but, of course, this trailer 10 could be constructed so as to utilize any other type of a body. The particular body 16 is supported on a frame or chassis 18 in a conventional manner. If desired the trailer 10 can be constructed so that the body 16 itself serves as the frame or chassis. In the particular trailer 10 the chassis 18 supports an extending tongue 20 which is adapted to be secured to a vehicle such as the vehicle 12 through the use of a conventional hitch 22. This tongue 20 and the hitch 22 are of course located at the front end 24 of the trailer 10.

The suspension system (not separately numbered) used with the trailer 10 is bilaterally symmetrical and includes an elongated axle 26 which extends generally beneath the chassis 18 between the sides 28 of the trailer 10. The ends 32 of this axle 26 (not separately numbered) are secured to conventional, identical wheels 30 in a conventional manner so that these wheels 30 are located generally along the sides 28 beneath the body 16. The axle 26 is supported by two identical conventional leaf springs 34 constructed so as to have a so-called positive arch configuration.

These springs 34 are located adjacent to the wheels 30. They are secured to the axles 26 by means of conventional U-bolts 36 and retaining plates 38. Although it is not normally necessary with the present invention because of the ability of the leaf springs 34 to twist slightly, if desired elastomeric grommets 40 may be utilized generally around the axle 26 where the bolts 36 are used to secure the axle 26 to the springs 34 in order to accommodate movement of the axle 26 during the use of the trailer 10 as herein described.

The rear ends 42 of the springs 34 are directly mounted to the chassis 18 in a conventional manner through the use of pins or bolts 44 carried by small mounting brackets 46. The front ends 48 of the springs 34 are secured to corresponding, identical brackets 50 located on the chassis 18 through the use of identical small shackles or links 52. These shackles 52 are secured to the springs 34 and to the brackets 46 in a conventional manner using other bolts or pins 54. With this construction the front ends 48 of the springs 34 are lower than the rear ends 42.

The various parts previously described used to support the trailer 10 utilizing the wheels 30 are preferably dimensioned and located so that when the trailer 10 is at rest upon a horizontal surface the weight of the trailer 10 or the weight of the trailer and the load in or on the trailer are proportioned so that the springs 34 hold the axle 26 so that the axle 26 is perpendicular to an imaginary line A extending between the front and rear ends 24 and 56, respectively, of the trailer 10 which is parallel or substantially parallel to the sides 28. Further, the weight of the trailer 10 either unloaded or loaded should be "balanced" so that there will be at least a minimal downward force on the tongue 20.

When the trailer 10 is constructed or loaded as indicated and is pulled behind a towing vehicle 12 as indicated in FIG. 2 of the drawing, the trailer will track or follow directly behind the vehicle 12 as the vehicle 12 is moved along a straight line. During such movement the springs 34 will deflect in a normal manner to accommodate road surface irregularities or the like. The construction described is significant in that it permits the trailer 10 to steer itself so as to automatically follow behind the vehicle 12 as this vehicle is moved and is turned as indicated in FIG. 2.

During such movement of the vehicle 12 around a curve a combination of forces will be applied to the springs 34 so as to "control" the relative positions of the axle 26 and the wheels 30 with respect to the remainder of the trailer 10. Such forces will be a combination of two different types of forces: those forces resulting from the weight of the trailer 10 supported through the use of the springs 34 by the wheels 30, and those forces which are derived from the movement of the trailer 10 around a curve. The latter forces are important in obtaining the steering action with the invention.

These forces will tend to increase on the side 28 of the trailer 10 remote from the center of curvature of the path the trailer 10 is travelling as the trailer 10 goes around a curve. They will also tend to decrease on the side 28 of the trailer 10 closest adjacent to the center of the arc through which the trailer 10 is being moved.

Such an increase and decrease in the forces applied to the springs 34 will, of course, be the result of the obvious forces derived as a result of rotation of an object about a center of rotation.

The construction previously described makes use of such forces to obtain a steering action. As will be apparent from the lines in phantom showing the axle 26 and the spring 34 in FIG. 1 of the drawing, as forces as described are applied several things occur. The springs 34 are mounted through the use of shackles 52 so that as they deflect upwardly an end 32 of the axle 26 is also moved upwardly. In addition, however, because of the differential between the elevations of the ends 42 and 48 of the springs 34, as the axle 26 is moved upwardly it also tends to move forwardly to a limited extent. Also, because of the construction of the springs 34 and the use of the shackles 52 at the front ends 48, as the spring 34 deflects upwardly the attached end 32 of the axle 26 moves forwardly. Similarly a decrease in the forces applied to a spring 34 will cause a limited reverse or rearward movement of the end 32 of the axle 26 connected to such spring 34.

Such movements of the springs 34 may be referred to as an increase in spring deflection on the side 28 remote from the center of rotation of the trailer 10 and a decrease in spring deflection on the side 28 of the trailer 10 closest adjacent to the center rearwardly. As a consequence of this the trailer 10 will tend to steer itself as it is towed or pulled around a curve. When the trailer 10 is thereafter towed in a straight line the axle 26 will thereafter assume its original position and the trailer 10 will automatically track behind the towing vehicle 12.

It is important to note that this same type of self-steering action will be achieved with the described structure in response to cross-winds applied to a side of the trailer 10 so that the trailer will follow the towing vehicle 12. Such cross-winds will cause the development of forces on the trailer 10 which will be transmitted to the springs 34 so as to cause movement of the axle 26 and the wheels 30 as previously indicated.

Figure 3:
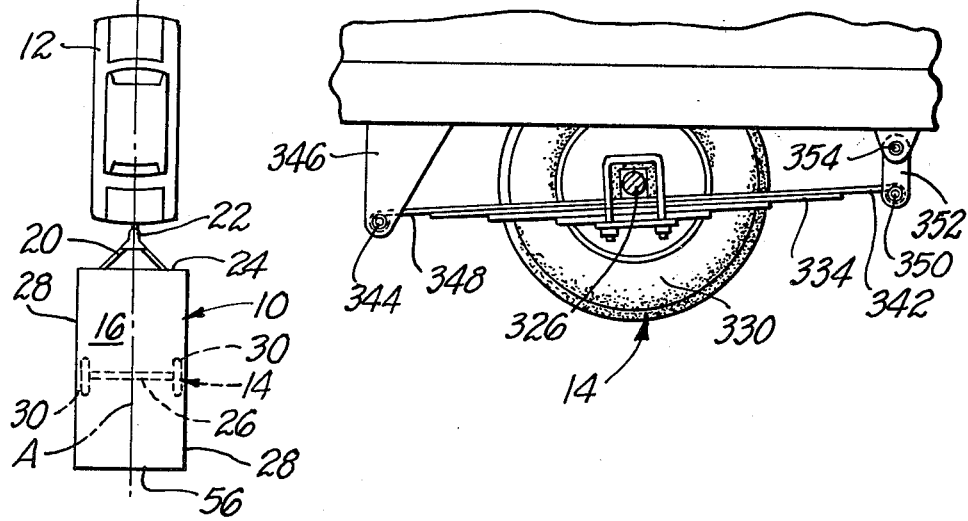
FIG. 3 is a partial side elevational view corresponding to FIG. 1 of a modified trailer suspension system of the present invention.

This type of self-steering action can be achieved in a number of different structures. As an example of this in FIG. 3 of the drawing one side of a bilaterally symmetrical structure is shown which uses two conventional leaf springs 334 having a flat or negative arch. In this FIG. 3 for convenience of explanation the numerals previously used to describe various parts of the trailer 10 shown in FIG. 1 are used so as to be preceded by the numeral "3" in order to minimize the description of various parts. Except as herein indicated a structure as shown in FIG. 3 is identical to the trailer 10 described in connection with FIG. 1. In this structure each spring 334 is mounted upon a bracket 346 located at the front end 348 of the spring 334 which extends below the bracket 344 and a shackle 352 at the rear end 342 of the spring 334. Bolts or pins 350 are, of course, used in connecting the springs 334 and the shackles 352.

The principles or concepts of the present invention are also applicable to trailers having several axles. As an example of this there is shown in FIG. 4 a structure which directly corresponds to the structure of the trailer 10 previously described, but which utilizes two axles 426. In this structure in FIG. 4 the numerals previously used to designate parts of the trailer 10 are preceded by the numeral "4" in order to minimize the description. Except as herein indicated the structure shown in FIG. 4 is identical to the structure shown in FIG. 1.

In the suspension system (not separately numbered) illustrated in FIG. 4 the two axles 426 are supported by two different springs 434, each of which is mounted generally as previously described. However, the adjacent front and rear ends 448 and 442 respectively of the springs 434 are connected by pivotally mounted, load equalizing brackets 456 as shown so that the rear ends 442 of the springs 434 are higher than the front ends 448 of the springs 434 carried by the shackles 452.

In FIG. 5 of the drawings there is shown a somewhat modified suspension system (not separately numbered) which is adapted to be substituted for the entire structure indicated in the preceding in connection with FIG. 1 for supporting the trailer 10 upon the wheels 14. In this structure shown in FIG. 5 two separate conventional, positive arch, quarter elliptical springs 558 are mounted on a chassis 518 corresponding to the chassis 18 previously described through the use of small brackets 560. These springs 558 correspond to the previously described springs 34 and are employed in locations such as are used with the springs 34. Each of these springs 558 may be connected to an end 532 of an axle 526 corresponding to the axle 26 previously described through the use of conventional U-bolts 536 and retaining plates 538. Although it is not considered it will normally be necessary because of the ability of the springs 558 to twist slightly, small elastomeric grommets 540 corresponding to the grommets 40 previously described may be utilized in mounting the ends 532 of the axle 526.

It is noted that these springs 558 are mounted so as to extend in a forward direction--i.e., in a direction in which a trailer is normally moved. It is also noted that these springs 558 are mounted so as to extend downwardly from the chassis 518. As a result of their positive arch characteristics and of the manner in which they are mounted they will tend to move the ends 532 of the axle 526 in the manners previously described as the trailer is turned so as to achieve the type of self-steering indicated in the preceding.

FIG. 6 of the drawings is intended to show the essential character of a suspension system (not separately numbered) employing a structure which is quite closely related to the structure described in connection with FIG. 5. In the structure shown in FIG. 6 two separate, conventional, flat or negative arch, quarter elliptical springs 658 are mounted upon brackets 660 so as to extend rearwardly and either horizontally or upwardly of the trailer (not separately identified) upon which this structure is used. Of course such a trailer directly corresponds to a trailer 10 as previously indicated. Two of the springs 658 are used and are connected to an axle 626 by means corresponding to those previously described. With this structure as with the previously described structures, forward and upward movement is used to accomplish steering of a trailer as the trailer is turned while it is being towed.

Figure 7:
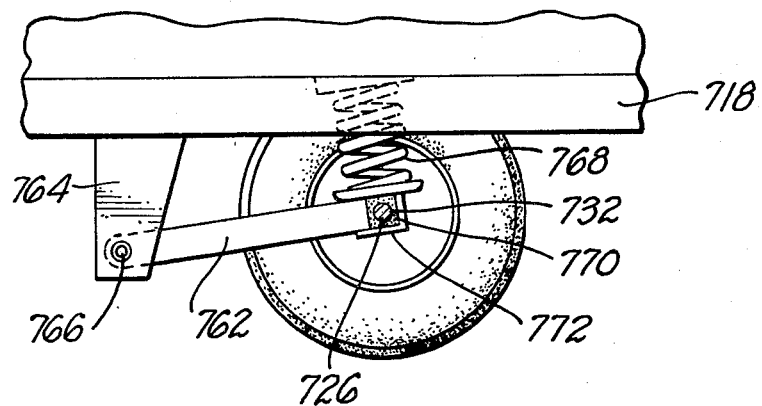
FIG. 7 is a partial side elevational view corresponding to part of FIG. 1 of still an additional modified trailer suspension system of the present invention.

The type of action used in accomplishing such steering can be achieved in various structures which differ from the previously described structure in that the wheels supporting a trailer are not directly mounted upon springs. In FIG. 7 of the drawing there is shown the essential character of such a structure in which wheels are not directly supported by springs. This FIG. 7 corresponds to the structures illustrated in the preceding FIGS. 3 to 7 in that it does not show a complete trailer and in that it shows only one side of a bilaterally symmetrical suspension system in the same manner in which one side of such a suspension system is illustrated in the preceding FIGS. 3 to 7.

Figure 8:
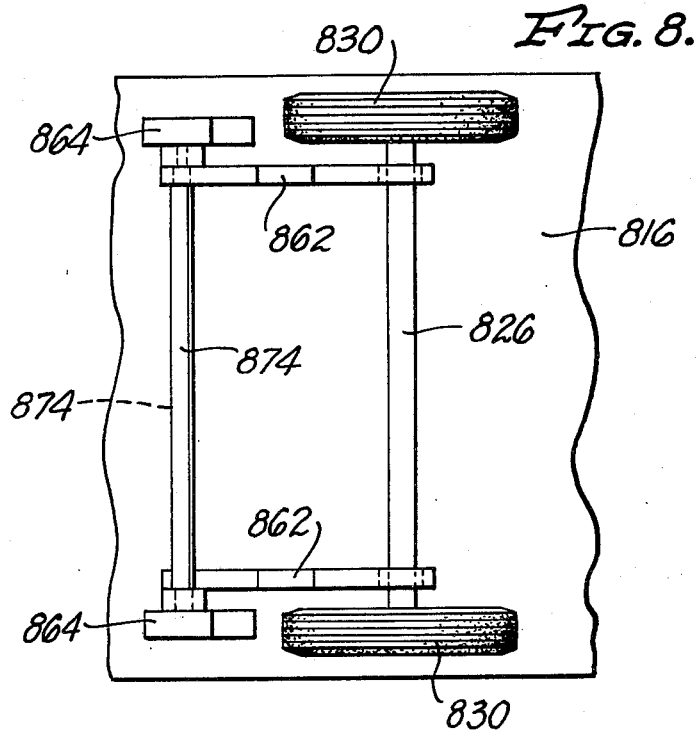
FIG. 8 is a partial side elevational view corresponding to part of FIG. 1 of a further additional modified trailer suspension system of the present invention.

In the FIG. 7 structure, wheels (not shown) are mounted upon ends 732 of an axle 726 and these ends 732 are supported by means of trailing arms 762. These trailing arms 762 may be mounted upon a chassis 718 through the use of downwardly extending brackets 764 attached to the chassis 718 by pivots 766. Each of the arms 762 extends from its corresponding bracket 764 generally rearwardly and upwardly and is normally held in such a position by means of a coil spring 768 supporting the arm 762 in such a manner as to permit counterclockwise rotation as indicated in FIG. 8. The ends 732 of the axle 726 may conveniently be secured to the arms 762 through the use of elastomeric pads 770 permitting limited twisting between the axle 726 and the arms 762 and through the use of conventional clamps 772. The spring 768 may be secured in place in any conventional manner.

This type of structure will achieve the same forward and upward movement used to accomplish steering of a trailer with the various structures previously described. Those skilled in the art will realize that structures corresponding to the structure illustrated in FIG. 7 may be achieved by utilizing torsion springs so as to directly mount the arms 862.

A structure of this type (not separately numbered) utilizing a torsion spring is indicated in FIG. 8. This structure illustrated in FIG. 8 differs from the structure shown in FIG. 7 solely in that it employs arms 862 which extend from brackets 864 rearwardly and upwardly and which are attached to the brackets 864 through the use of conventional torsion springs 874.

In all of the various structures previously described a continuous axle, such as, for example, the initially described axle 26, is used generally beneath a trailer. With various structures as indicated frequently satisfactory results can be achieved by substituting known or conventional type split axles such as, for example, split axle constructions which are designed or intended for use primarily in accommodating road shocks or irregularities in connection with suspension systems. Certain of such split axles are constructed so as to enable minor adjustments for camber and toe in to be made in order to achieve a desired degree of wheel alignment.

Such structures as described in the preceding paragraph do not have a continuous axle to "couple" the wheels on opposite sides of the trailer so that these wheels move as a "unit" in order to accomplish the steering action described. As a result of this it is necessary to utilize appropriate suspension structures with the wheels in structures not having continuous axles so that these wheels can move in response to applied loads in order to achieve the steering action herein described. Specifically, the wheels in such structures not having continuous axles must be mounted in such a manner as to be capable of turning upwardly and inwardly toward the center of the trailer in order to be able to steer the trailer in accordance with the movement of the trailer around the curve or in order to steer or control the movement of the trailer as it is being towed in a straight line, and as it is being subjected to wind loads tending to move it.

We claim:

1. A trailer suspension system for use as a part of a complete trailer which is adapted to be towed behind a moving vehicle, said trailer including a body structure having a front, a rear, sides and a bottom, wheels located substantially adjacent to said sides between said front and said rear and extending generally beneath said body, said suspension system including an individual suspension means connecting each of said wheels to said body structure, each of said suspension means being capable of permitting movement of the wheel associated with it in a generally vertical direction in response to surface irregularities in which the improvement comprises:

an axle means connecting each of said wheels to another of said wheels, said wheels being located on the ends of said axle means, said axle means extending beneath said bottom and being movable with respect to said body structure, each of said suspension means comprising a leaf spring having front and rear ends and a shackle, said shackle being pivotally connected between the front end of said spring and said body, the rear end of said spring being pivotally connected to said body, said axle means being connected to said springs between the ends of said springs, whereby each of said suspension means is capable of moving in response to an applied force so as to vary the angle of the wheel associated with it and the position of said axle means with respect to said body and the wheel on the other end of said axle means so as to be capable of steering said trailer as said trailer is towed behind said vehicle so that said trailer follows the direction of movement of said vehicle.

2. A trailer suspension system as claimed in claim 1 wherein:

each of said leaf springs comprises an elongated spring mounted upon said body so as to be capable of movement relative to said body in response to surface irregularities, each of said leaf springs supporting the wheel associated with it in such a manner that during flexure of it generally toward said body structure the wheel associated with it is moved generally toward said front and generally upwardly.

3. A trailer suspension system as claimed in claim 1 wherein:

there is one of said axle means and there are two of said wheels, each of said wheels being located adjacent to a side of said body structure, each of said springs connecting said axle means adjacent to an extremity thereof to an adjacent portion of said body structure, said springs supporting said axle means and said wheels in such a manner that during flexure of said springs said axle is turned so as to turn said wheels.

4. A trailer suspension system as claimed in claim 1 wherein:

there are two of said axle means extending beneath said bottom parallel to one another and being movable with respect to said body structure, there are four of said wheels, each of said wheels being located on an end of one of said axle means, two of said wheels being located adjacent to one side of said body structure and two of said wheels being located adjacent to the other side of said body structure, each of said springs connecting one end of said axle means adjacent to an extremity thereof with an adjacent portion of said body structure, said springs supporting said axle means and said wheels in such a manner that during flexure of any one of said springs the axle means connected to it is turned so as to turn said wheels.

5. A trailer suspension system as claimed in claims 3 or 4 wherein:

during flexure of any one of said springs causing movement of the associated extremity of its axle means toward said body structure said associated extremity of said axle means moves toward said front of said trailer.

6. A trailer suspension system for use as a part of the complete trailer which is adapted to be towed behind a moving vehicle, said trailer including a trailer body structure having a front, a rear, sides and a bottom, said suspension system including at least one axle extending underneath said body structure generally between the sides thereof, wheels located on the ends of said axle, two mounting means, each of said mounting means resiliently connecting one of said ends of said axle to said body structure in which the improvement comprises:

both of said mounting means including a leaf spring having front and rear ends and a shackle, said shackle being pivotally connected between the front end of said spring and said body, the rear end of said spring being pivotally connected to said body, said axle means being connected to said springs between the ends of said springs so that as said trailer is towed behind said vehicle in a straight line said axle extends substantially perpendicular to said line and being constructed so that when said trailer is thereafter turned generally toward either one of its sides as a result of said vehicle being turned in such direction and as a result of the tendency of said trailer to apply unequal forces to said mounting means during such a turn, said mounting means will be deflected so as to vary the position of said axle relative to said body structure in such a manner that the end of said axle at such side will move toward the rear of said body structure while the end of said axle at the other of said sides will move toward the front of said body structure, the amount of such movement of said ends of said axle being dependent upon the magnitude of the forces applied to said mounting means as a result of such turn.

* * * * *